United States Patent [19]

Ohuchi

[11] Patent Number: 4,984,183

[45] Date of Patent: Jan. 8, 1991

[54] GRAPHICS DISPLAY CONTROLLER FOR TRANSFERRING FIGURE DATA TO OVERLAPPING PORTIONS OF DESTINATION AREA AND DRAWING-ENABLE AREA DEFINED BY CLIPPING RECTANGLE

[75] Inventor: Mitsurou Ohuchi, Tokyo, Japan

[73] Assignee: NEC Corporation, Tokyo, Japan

[21] Appl. No.: 156,148

[22] Filed: Feb. 16, 1988

[30] Foreign Application Priority Data

Feb. 13, 1987 [JP] Japan .................................. 62-31023

[51] Int. Cl.⁵ ............................................... G06F 15/62
[52] U.S. Cl. ..................................... 364/521; 340/724
[58] Field of Search ................. 364/521, 518; 340/723, 340/724

[56] References Cited

U.S. PATENT DOCUMENTS

| | | | |
|---|---|---|---|
| 4,688,032 | 8/1987 | Saito et al. ...................... | 340/724 X |
| 4,710,767 | 12/1987 | Sciacero et al. ................ | 340/723 X |
| 4,731,606 | 3/1988 | Bantz et al. ..................... | 340/723 X |
| 4,779,210 | 10/1988 | Katsura et al. ................... | 364/521 |

Primary Examiner—Dale M. Shaw
Assistant Examiner—Mark K. Zimmerman
Attorney, Agent, or Firm—Sughrue, Mion, Zinn, Macpeak & Seas

[57] ABSTRACT

A graphics display controller for transferring figure data to an overlapping portion of a destination area and a drawing-enable area, the drawing-enable area being defined by a clipping rectangle having a diagonal line defined by first and second coordinate data. The controller includes a comparator comparing the coordinate data of each word in the destination area with the first and second coordinate data, a first mask data circuit responding to a comparison result from the comparator to generate first mask data designating bit or bits of each word of the destination area contained in the drawing-enable area, a second mask data circuit responding to a position of the word of the destination area to generate second mask data designating bit or bits of the word containing the destination area, and a drawing control circuit writing the figure data into the bit or bits designated by both of the first and second mask data.

7 Claims, 5 Drawing Sheets

GRAPHICS DISPLAY CONTROLLER FOR TRANSFERRING FIGURE DATA TO OVERLAPPING PORTIONS OF DESTINATION AREA AND DRAWING-ENABLE AREA DEFINED BY CLIPPING RECTANGLE

BACKGROUND OF THE INVENTION

The present invention relates to a graphics display controller for managing a display memory and drawing figures on a screen of a raster-scan display and, more particularly, to such a controller having a clipping function for clipping or limiting a drawing area of figures on a display screen.

A clipping function is used to allow figures to be drawn only into an inside (or outside) area of a rectangle which has a diagonal line defined by two coordinate data on a display screen. This rectangle is called hereinafter "clipping rectangle". When figure data of a first area are transferred, by use of the clipping function, to a second area which has one portion contained in a drawing-enable area defined by the clipping rectangle, only data of that portion of the second area should be replaced by the figure data of the first area. According to prior art, the coordinate data of every dot is compared with the above-mentioned two coordinate data to detect the portion of the second area overlapping the drawing-enable area defined by the clipping rectangle and the data of the portion of the second area are replaced one-bit by one-bit by the figure data of the first area. For this reason, a considerably long processing time is required.

SUMMARY OF THE INVENTION

Therefore, an object of the present invention is to provide a graphics display controller executing a clipping function at a high speed.

Another object of the present invention is to provide a graphics display controller which transfers at a high speed figure data to a drawing-enable area defined by a clipping rectangle without a complicated circuit construction.

According to the present invention, a graphics display controller having a function of transferring figure data of a source area to a destination area including a portion contained in a drawing-enable area defined by a clipping rectangle having a diagonal line defined by first and second coordinate data, comprises comparing means for comparing coordinate data of each word of the destination area with the first and second coordinate data to detect that the coordinate data of each word is within or out of the drawing-enable area or is the same as a boundary of the drawing-enable area, first generating means responsive to comparison result of the comparing means for generating first information designating bit or bits whose data are allowed to be rewritten in each word of the destination area, second generating means responsive to a position of each word of the destination area for generating second information designating bit or bits whose data are allowed to be rewritten in each word of the destination area, and means for writing the figure data into the bit or bits which are designated by both of the first and second information in each word of the destination area.

In the present invention, the coordinate data of each word, not each bit, of the destination area is compared with the first and second coordinate data which are used for defining the clipping rectangle, and the data of each word, not each bit, of the destination area are controlled to be replaced or not replaced by the figure data. A processing time is thereby shortened. Moreover, the first information representative of clipping mask information and the second information representative of drawing mask information are generated independently of, each other. When the comparison result represents that the coordinate data of the word of the destination area is within the drawing-enable area defined by the clipping rectangle, the first information designates all the bits whose data are allowed to be rewritten in that word. At this time, when the second information designates similarly all the bits whose data are allowed to be rewritten, the data of all bits of this word is rewritten or replaced by the figure data to be drawn. On the other hand, in case where the second information designates several bits, not all bits, whose data are to be written, only the data thereof are rewritten by the figure data. When the comparison result represents that the coordinate data of the word of the destination area is out of the drawing-enable area, the first information designates no bit whose data is allowed to be rewritten, because this word is outside the drawing-enable area. The data of all the bits of this word are thereby not rewritten irrespective of the second mask information. When the comparison result represents that the coordinate data of the word of the destination area is the same as the boundary of the drawing-enable area, the first information designates a plurality of bits, but not all bits, which are inside the drawing-enable area. As a result, one or more bits in the word which are designated by both of the first and second information are rewritten by the figure data. Thus, only the data of the portion of the destination area, which is contained in the drawing-enable area defined by the clipping rectangle, are rewritten by the figure data to be drawn.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
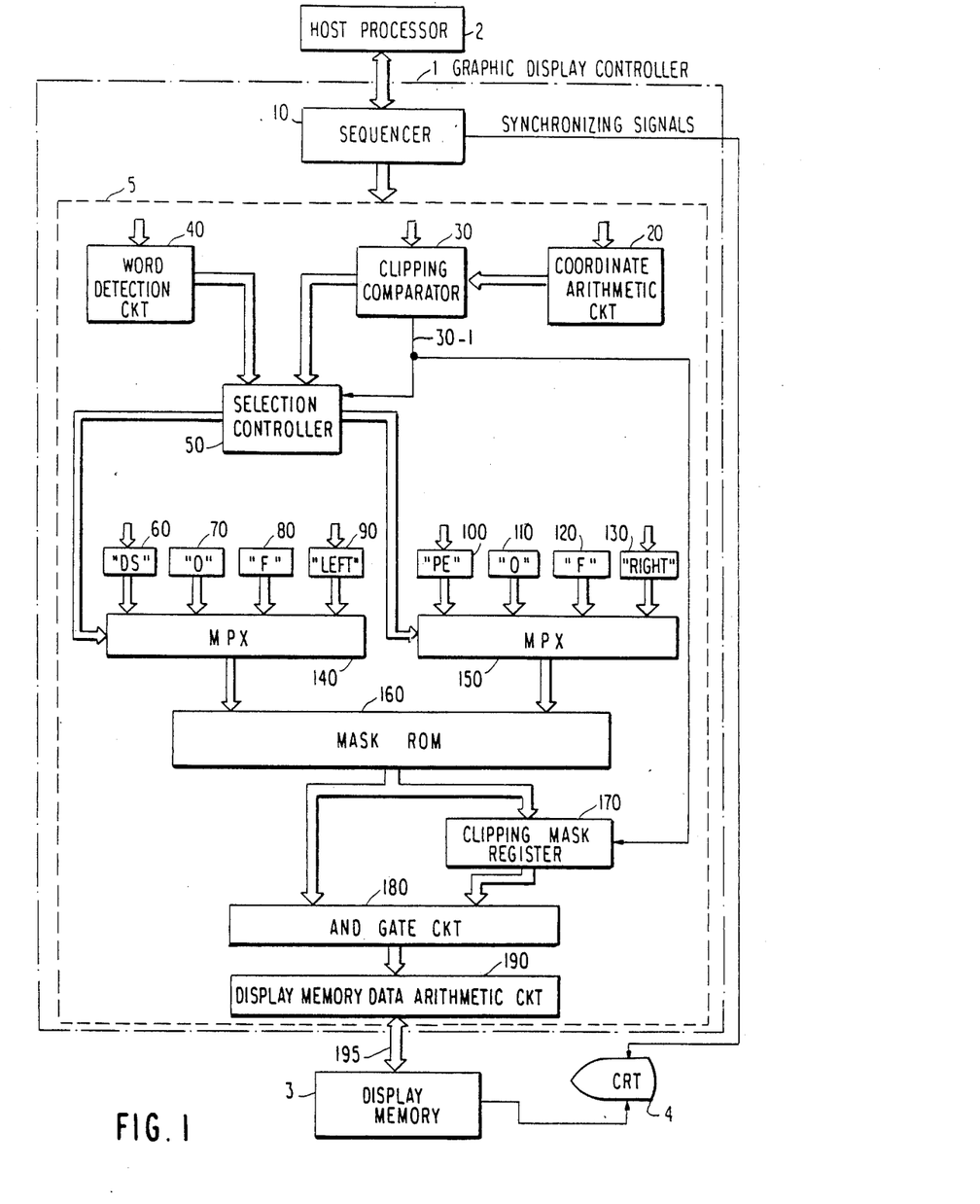
FIG. 1 is a block diagram representative of an embodiment of the present invention.

Referring to FIG. 1, a graphics display controller 1 according to an embodiment of the present invention receives instructions from a host processor 2 and manages a display memory 3. The controller 1 further draws various figures on a display screen of a cathode-ray tube (CRT) 4 by use of data stored in the display memory 3. The CRT 4 is supplied with synchronizing signals from the controller 1. The graphics display controller 1 includes a sequencer 10 generating various timing signals and data for executing the instructions from the host processor 2. The controller 1 further includes a clipping performing section 5 in accordance with the present invention. Before the description is made on a construction and an operation of the clipping performing section 5, a clipping function with respect to figure data transmission operation will be described below with reference to FIG. 2.

Figure 2:
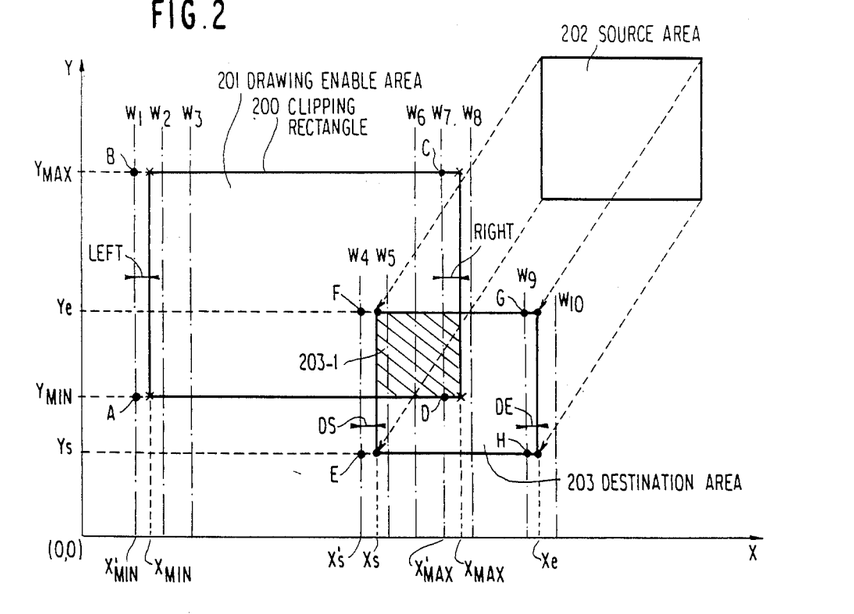
FIG. 2 is a diagram representative of a relationship of a clipping rectangle, a data source area and a data destination area.

FIG. 2 shows a display screen of the CRT 4, and a horizontal direction of the display screen is defined as an X-axis and a vertical direction thereof is defined as a Y-axis. Each of dots of the display screen corresponds to each of bits of the display memory 3. Therefore, the diagram shown in FIG. 2 can be regarded as a memory map of the display memory 3 and each bit of the display memory 3 has individual coordinate data on the display screen. The display memory 3 consists of a plurality of words, each of which is constructed by sixteen bits. The coordinate data of each word or each bit also represents address data thereof. In FIG. 2, each of characters $W_1$ to $W_{10}$ represents each of boundaries of the words arranged in the direction of the X-axis. A clipping rectangle 200 is defined as a rectangle having a diagonal line, one end of which positions at a first clipping coordinate $(X_{min}, Y_{min})$ and the other end of which positions at a second clipping coordinate $(X_{max}, Y_{max})$. An inside area 201 of the clipping rectangle 200 is employed as a drawing-enable area. That is, figures are allowed to be drawn only within this drawing-enable area 201. If desired, an outside area of the clipping rectangle 200 can be employed as a drawing-enable area. As shown in FIG. 2, the left side of the clipping rectangle 200 is apart from the word boundary $W_1$ by the number of bits represented as first offset data "LEFT" and the right side thereof is apart from the word boundary $W_7$ by the number of bits represented as second offset data "RIGHT". A source area 202 includes figure data to be transferred, and this figure data is transferred to a destination area 203 in response to a bit-block-transfer instruction supplied from the host processor 2. This destination area 203 is a rectangular area having a diagonal line defined by two coordinates represented by (Xs, Ys) and (Xe, Ye) and has the same size as the source area 202. Moreover, the destination area 203 has one portion 203-1 denoted by oblique lines and included in the drawing-enable area 201 defined by the clipping rectangle 200. The left side of the destination area 203 is apart from the word boundary $W_4$ by the number of bits represented as third offset data "DS" and the right side thereof is apart from the word boundary $W_9$ by the number of bits represented as fourth offset data "DE". Since only the portion 203-1 of the destination area 203 is included in the drawing-enable area 201, all the figure data of the source area 202 are not transferred to the destination area 203, but only the data of the portion 203-1 of the destination area 203 are rewritten or replaced by the figure data of the corresponding portion of the source area 202.

In order to perform this data transmission at a high speed, the clipping performing section 5 of the graphics display controller 1 shown in FIG. 1 executes a data processing operation in word units and generates clipping mask information and drawing mask information independently of each other. The clipping mask information is generated by a coordinate arithmetic circuit 20, a clipping comparator 30, a selection controller 50, registers 70, 80, 90, 110, 120 and 130, multiplexers 140 and 150, a mask ROM (read only memory) 160, and a clipping mask register 170.

Figure 3:
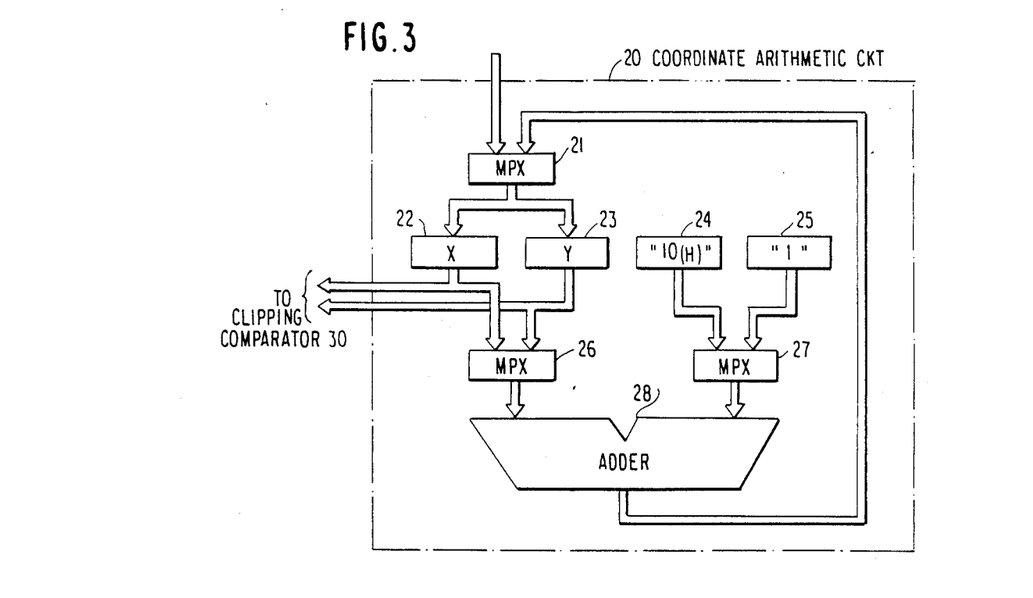
FIG. 3 is a block diagram representative of a coordinate arithmetic circuit shown in FIG. 1.

The coordinate arithmetic circuit 20 calculates X-coordinate data and Y-coordinate data of a starting bit (LSB) of each word, not those of each bit, in the destination area 203. The construction of the circuit 20 is shown in FIG. 3. As initial coordinate data, the sequencer 10 writes a value of the X-coordinate data Xs' into a register 22 and a value of the Y-coordinate data Ys into a register 23 via a multiplexer 201, respectively. The X-coordinate data Xs' represents the starting bit of the word that has the bit designated by the X-coordinate data Xs. The coordinate data Xs' is obtained by changing less significant four bits of the coordinate Xs to "0000". The initial X-coordinate data X's and Y-coordinate data Ys represents a point E shown in FIG. 2. The contents of the registers 22 and 23 are supplied to the clipping comparator 30 and further to an adder 28 via a multiplexer 26 in time-sharing. When the multiplexer 26 selects the content of the register 22, a multiplexer 27 selects a register 24 and transfers the content thereof to the adder 28. The register 24 stores a value of 16 in decimal, i.e. 10(H) in hexadecimal. The mark "(H)" denotes a hexadecimal representation. The adder 28 adds the content of the register 24 to the content of the register 22 and feeds the result back to the register 22 via the multiplexer 21. When the content of the register 22 reaches the X-coordinate data representing the last word in the same horizontal line of the destination area 203, the multiplexer 26 selects the content of the register 23. The multiplexer 27 thus selects a register 25 storing a value of 1. The adder 28 adds the content of the register 25 to the content of the register 23 and feeds the result back to the register 23. The register 22 is thereafter rewritten with the initial data $X_s'$. Thus, the X-coordinate data and Y-coordinate data designating the starting bit of each word contained in the destination area 203 are calculated by the coordinate arithmetic circuit 20 and then supplied to the clipping comparator 30 in order.

The clipping comparator 30 compares the X-coordinate data X and Y-coordinate data Y supplied from the coordinate arithmetic circuit 20 with the first and second clipping coordinate data $(X_{min}, Y_{min})$ and $(X_{max}, Y_{max})$ to detect the word or words of the destination area 203 which are contained in the drawing-enable area 201. Since the X-coordinate data X supplied from the circuit 20 designates the starting bit of each word in the designation area 203, the first clipping X-coordinate data $X_{min}$ is preferably converted into a first virtual X-coordinate data $X'_{min}$ that designates the starting bit (LSB) of the word having the bit designated by the first clipping X-coordinate $X_{min}$. Similarly, the second clipping X-coordinate data $X_{max}$ is preferably converted into a second virtual X-coordinate data $X'_{max}$ that designates the starting bit (LSB) of the word having the bit designated by the second clipping X-coordinate data $X_{max}$. The first and second virtual X-coordinate data $X'_{min}$ and $X_{max}$ are obtained by changing values of less significant four bits of the first and second clipping X-coordinate data $X_{min}$ and $X_{max}$ to "0000", respectively. That is, the clipping comparator 30 employs a virtual clipping rectangle defined by four points A, B, C and D shown in FIG. 2 to perform a comparing operation in word units. Thus, the clipping comparator 30 executes the following four arithmetic operations with respect to the X and Y coordinate data of each word of the destination area 203.

$$Y-Y_{min}, Y-Y_{max}$$

$$X-X'_{min}, X-X'_{max}$$

Figure 4:
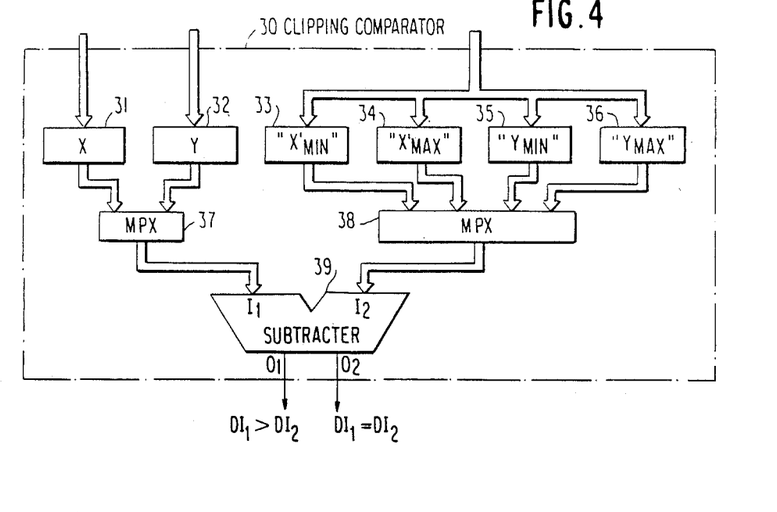
FIG. 4 is a block diagram representative of a clipping comparator shown in FIG. 1.

As shown in FIG. 4, the sequencer 10 writes in an initial state the first virtual X-coordinate data $X'_{min}$, the second virtual X-coordinate data $X'_{max}$, the first clipping Y-coordinate data $Y_{min}$ and the second clipping Y-coordinate data $Y_{max}$ into registers 33, 34, 35 and 36, respectively. The calculated X-coordinate and Y-coordinate data X and Y generated from the coordinate arithmetic circuit 20 are written into registers 31 and 32, respectively. A multiplexer 37 supplies the contents of the registers 31 and 32 to a first set of input terminals $I_1$ of a subtracter 39 in time-sharing. When the multiplexer 37 selects the content of the register 31, a multiplexer 38 supplies the contents of the registers 33 and 34 to a second set of input terminals $I_2$ of the subtracter 39 in time-sharing. When the multiplexer 37 selects the register 32, the multiplexer 38 supplies the contents of the registers 35 and 36 to the subtracter 39 in time-sharing. The subtracter 39 has first and second output terminals $O_1$ and $O_2$. The first output terminal $O_1$ takes logic "1" only when the first data $DI_1$ supplied to the first input terminal $I_1$ is larger than the second data $DI_2$ supplied to the second input terminal $I_2$, and the second output terminal $O_2$ takes logic "1" only when the first and second data $DI_1$ and $DI_2$ are equal to each other. The clipping comparator 30 performs at first the comparing operation with respect to the Y-coordinate data and thereafter does with respect to the X-coordinate data. Thus, the clipping comparator 30 detects the word or words in the destination area 203 which are contained inside the virtual clipping rectangle defined by the points A, B, C and D shown in FIG. 2.

The selection controller 50 (FIG. 1) receives and stores the comparison results from the clipping comparator 2 and generates selecting control signals to control the multiplexers 140 and 150. The controller 50 further receives detection outputs from a word detection circuit 40 which will be described later and from the clipping comparator 30 a control signal 30-1 representing that the clipping comparator 30 is performing the comparing operation. When the controller 50 is supplied with the control signal 30-1, it does not receive the detection outputs from the circuit 40. Also in this state, the multiplexer 140 selects one of the registers 70, 80 and 90 and the multiplexer 150 selects one of the registers 110, 120 and 130 in response to the selecting control signals supplied from the controller 50.

Since the clipping comparator 30 employs the virtual clipping rectangle defined by the points A, B, C and D shown in FIG. 2, if the X-coordinate data X is coincident with the first or second virtual X-coordinate data $X'_{min}$ or $X'_{max}$, a correction is requires to obtain true clipping mask information. For this purpose, the first and second offset data LEFT and RIGHT are written into the registers 90 and 130 by the sequencer 10, respectively. The registers 70 and 110 stores a value of "0" and the registers 80 and 120 stores a value of "F" (i.e. "1111").

In accordance with the comparison outputs from the clipping comparator 30, the multiplexer 140 and 150 are controlled by the selection controller 150, as shown in the following TABLE-1.

TABLE 1

| Y-coordinate Comparison | X-coordinate Comparison | Output of MPX 140 | Output of MPX 150 |
|---|---|---|---|
| $Y < Y_{min}$ or $Y > Y_{max}$ | Don't Care | "F" | "O" |
| $Y \geq Y_{min}$ and $Y \leq Y_{max}$ | $X > X'_{min}$ and $X < X'_{max}$ | "O" | "F" |
| | $X = X'_{min}$ and $X < X'_{max}$ | "LEFT" | "F" |
| | $X > X'_{min}$ and $X = X'_{max}$ | "O" | "RIGHT" |
| | $X = X'_{min}$ and $X = X'_{max}$ | "LEFT" | "RIGHT" |
| | $X < X'_{min}$ or $X > X'_{max}$ | "F" | "O" |

The output data from the multiplexers 140 and 150, i.e. eight bits data in total, are supplied to the mask ROM 160 as address information. Assuming that the number of bits represented by the first offset data "LEFT" is 5 and that represented by the second offset data "RIGHT" is 10, the mask ROM 160 generates clipping mask information consisting of sixteen bits and indicated in the following TABLE-2 in response to the address information supplied from the multiplexers 140 and 150.

TABLE 2

| Output of MPX 140 | Output of MPX 150 | Clipping Mask Information from Mask ROM 160 |
|---|---|---|
| "F" | "O" | "0000 0000 0000 0000" (all "0") |
| "O" | "F" | "1111 1111 1111 1111" (all "1") |
| "LEFT" | "F" | "0000 0111 1111 1111" ← "LEFT" |
| "O" | "RIGHT" | "1111 1111 1100 0000" "RIGHT" → |
| "LEFT" | "RIGHT" | "0000 0111 1100 0000" "LEFT" ← → "RIGHT" |
| "F" | "O" | "0000 0000 0000 0000" (all "0") |

In TABLE-2, "0" of the clipping mask information represents drawing-disenable information. That is, the data of the corresponding bit of the destination area 203 must not be rewritten or replaced by the figure data of the source area 202. On the other hand, "1" of the clipping mask information represents drawing-enable information in which the data of the corresponding bit of the destination area 203 is allowed to be rewritten by the figure data of the source area 202. More specifically, a fact that the calculated Y-coordinate data Y of the word in the destination area 203 is smaller than the first clipping Y-coordinate data $Y_{min}$ or larger than the second clipping Y-coordinate data $Y_{max}$ represents that all the bits of this word lie outside the drawing-enable area 201. Therefore, all the bits of the clipping mask information takes "0" (i.e., the drawing-disenable information) irrespective of the X-coordinate data X of the word. When $Y \geq Y_{min}$ and $Y \leq Y_{max}$, the word in the destination area 203 is present inside the drawing-enable area 201 with respect to the Y-coordinate, and therefore the clipping mask information is determined by the X-coordinate data comparison result. The determination result is as follows (see also TABLE-1 and TABLE-2):

$$X > X'_{min} \text{ and } X < X'_{max} \qquad (1)$$

Since all the bits of the word of the destination area 203 are contained in the drawing-enable area 201, all the bits of the clipping mask information take the drawing-enable information (i.e., all "1").

$$X = X'_{min} \text{ and } X < X'_{max} \quad (2)$$

Since the word of the destination area 203 includes the left side of the drawing-enable area 201, the data from the starting bit (LSB) to the bit designated by the first offset data (i.e. the first correction data) "LEFT" are "0" (the drawing-disenable information) and the remaining bits take "1".

$$X > X'_{min} \text{ and } X = X'_{max} \quad (3)$$

Since the word of the destination area 203 includes the right side of the drawing-enable area 201, the data from the starting bit (LSB) to the bit designated by the second offset data (i.e., the second correction data)

$$X = X'_{min} \text{ and } X = X'_{max} \quad (4)$$

Since the word of the destination area 203 includes both of the left and right sides of the drawing-enable area 201, the data from the starting bit (LSB) to the bit designated by the first offset data "LEFT" are "0", and the data from the bit next to the bit designated by the first offset data "LEFT" to the bit designated by the second offset data "RIGHT" are "1", the remaining bits taking "0".

$$X < X'_{min} \text{ or } X > X'_{max} \quad (5)$$

Since the word of the destination area 203 is present outside the drawing-enable area 201, all the bits of the clipping mask information take "0".

Thus, the clipping mask information is generated from the mask ROM 160 in response to the relationship between the drawing-enable area 201 and the location of each word of the destination area 203. Since the mask ROM 160 is employed, various clipping mask information is generated without a complicated circuit construction. The output of the multiplexer 140 is supplied to the ROM 160 as more significant address information and the output of the multiplexer 150 is supplied thereto as less significant address information.

The control signal 30-1 from the clipping comparator 30 is further supplied to the clipping mask register 170 as a store-enable signal. The register 170 stores the clipping mask information therein in response to the change of the signal 30-1 from the active level to the inactive level, i.e. when the clipping comparator 30 completes the coordinate data comparing operation with respect to one word in the destination area 203. The clipping mask information stored in the register 170 is supplied to an AND gate circuit 180 consisting of sixteen AND gates.

When the clipping comparator 30 completes the coordinate data comparing operation, i.e. when the control signal is changed to the inactive level, the selection controller 50 receives the detection outputs of the word detection circuit 40 in place of the results from the comparator 30. Thus, a processing operation for generating drawing mask information starts. The drawing mask information is used for defining the destination area 203 and is generated by the word detection circuit 40, the selection controller 50, registers 60, 70, 100 and 120, the multiplexers 140 and 150, and the mask ROM 160. The registers 80, 90, 110 and 130 are not used.

Figure 5:
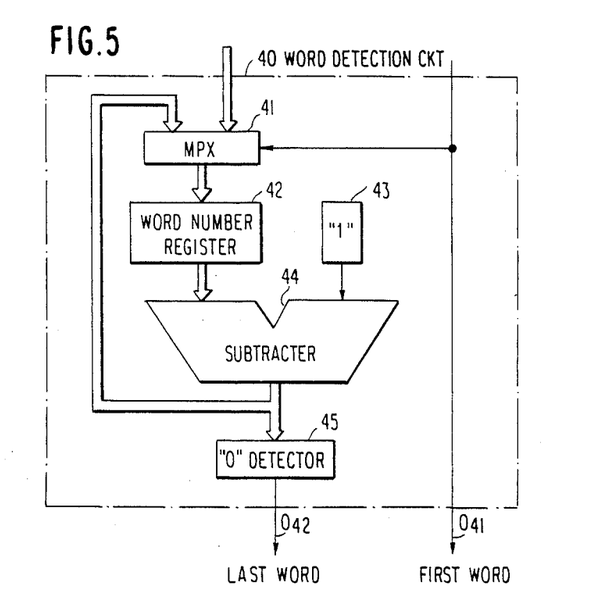
FIG. 5 is a block diagram representative of a word detection circuit shown in FIG. 1.

The word detection circuit 40 delects what number of words in the destination area 203 is processed and supplies the detection outputs to the controller 50. As shown in FIG. 5, the circuit 40 includes a word number register 42 in which the number of words in the horizontal direction of the destination area 203 is written in an initial state via a multiplexer 42 by the sequencer 10. A control signal used for controlling the multiplexer 41 so as to transfer the data from the sequencer 10 to the register 42 is supplied to a first output terminal $O_{41}$ of the circuit 40. Accordingly, the output terminal $O_{41}$ takes logic "1" only when the first word (i.e., the left end word) in the horizontal direction of the destination area 203 is processed. The content of the register 42 is supplied to one input end of a subtracter 44 having the other end supplied with a value of "1" from a register 43. The subtracter 44 subtracts the content of the register 43 from the content of the register 42 and feeds the result back to the register 42. The subtraction result of the subtracter 44 is further supplied to a zero-detector 45 which produces logic "1" to a second output terminal $O_{42}$ when the result of the subtracter 44 is zero. Accordingly, the second output terminal $O_{42}$ takes logic "1" when the last word (i.e., the right end word) in the horizontal direction of the destination area 203 is processed. When the words (i.e., intermediate words) except the first and last words in the horizontal direction of the destination area 203 is processed, both of the output terminals $O_{41}$ and $O_{42}$ take logic "0". Although not shown, the logic "1" from the second output terminal $O_{42}$ is supplied to the sequencer 10, so that the sequencer 10 writes the number of words into the register 42 via the multiplexer 41 when the processing operation with respect to the last word in the horizontal direction of the destination area 203 is completed. At this time, the sequencer 10 further writes the initial X-coordinate value X's into the register 22 (see FIG. 3) of the coordinate arithmetic circuit 20.

The selection controller 50 receives the detection outputs from the word detection circuit 40 and produces selecting control signals to the multiplexers 140 and 150 which in turn select one of the registers 60 and 70 and one of the registers 100 and 120, respectively.

Since the data processing operation is carried out in word units, the correction using the third and fourth offset data "DS" and "DE" is required to obtain the drawing mask information. For this purpose, the third and fourth offset data "DS" and "DE" are written into the resiters 60 and 100 by the sequencer 10, respectively.

In accordance with the detection outputs of the word detection circuit 40, the multiplexers 140 and 150 are controlled by the selection controller 50, as shown in the following TABLE-3.

TABLE 3

| Processed Word | Output of MPX 140 | Output of MPX 150 |
|---|---|---|
| First Word (Left End Word) | "DS" | "F" |
| Last Word (Right End Word) | "0" | "DE" |
| Other Words (Intermediate Words) | "0" | "F" |

The outputs of the multiplexers 140 and 150, i.e. eight bits data in total, are supplied to the mask ROM 160 as address information. Assuming that a value of the third offset data "DS" is 8 and that of the fourth offset data "DE" is 4, the mask ROM generates the drawing mask information consisting of sixteen bits and indicated in the following TABLE-4.

TABLE 4

| Output of MPX 140 | Output of MPX 150 | Drawing Mask Information from Mask ROM 160 |
|---|---|---|
| "DS" | "F" | "0000 0000 1111 1111" ⟵⟶ "DS" |
| "0" | "DE" | "1111 0000 0000 0000" ⟵⟶ "DE" |
| "0" | "F" | "1111 1111 1111 1111" (all "1") |

In TABLE-4, "0" of the drawing mask information represents the drawing-disenable information and "1" thereof represents the drawing-enable information. More specifically, when the first word in the horizontal direction of the destination area 203 is processed, this word includes the left side of the destination area 203. Accordingly, the data from the starting bit (LSB) to the bit designated by the offset data "DS" are "0", and the remaining bits take "1". The last word in the horizontal direction of the destination area 203 includes the right side of the destination area 203, and therefore the data from the starting bit (LSB) to the bit designated by the offset data "DE" are "1" and the remaining bits take "0". With respect to the intermediate words, all the bits of the drawing mask information take "1". Thus, the drawing mask information for defining the true destination area 203 is generated from the mask ROM 160 and then supplied to the AND gate circuit 180.

Figure 6:
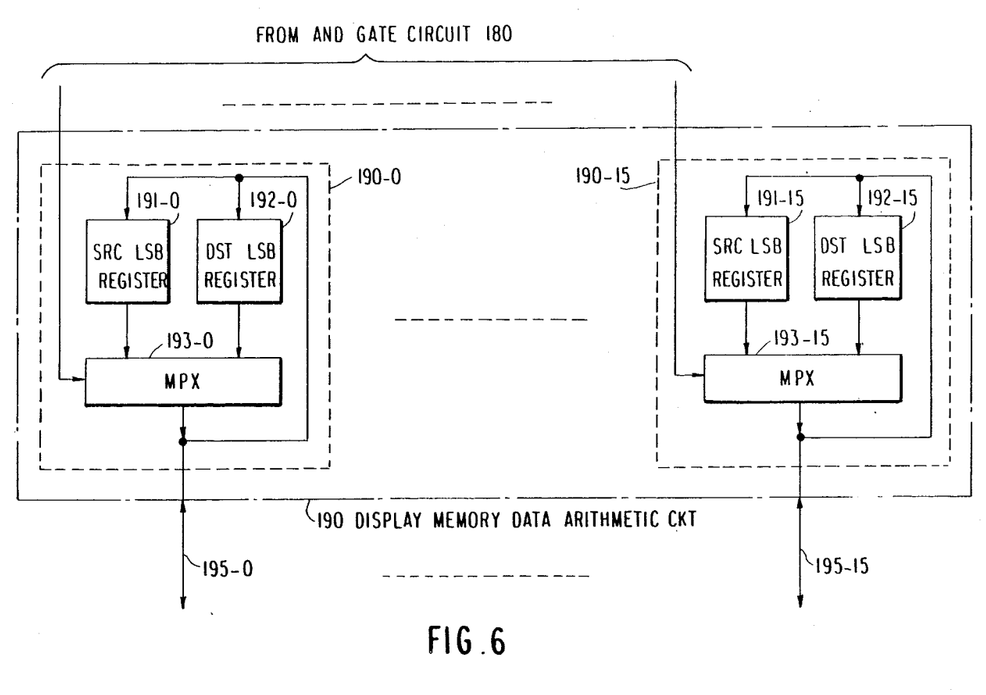
FIG. 6 is a block diagram representative of a display memory data arithmetic circuit shown in FIG. 1.

The AND gate circuit 180 includes sixteen AND gates (not shown), each of which receives the associated bit data of the drawing mask information and the clipping mask information. Therefore, each of the AND gates produces logic "1" only when the associated bit data of the drawing mask information and the clipping mask information take "1" (i.e., the drawing-enable information). The output of the AND gate circuit 180 is supplied to a display memory data arithmetic circuit 190 whose construction is shown in FIG. 6. This circuit 190 includes sixteen unit blocks 190-0 to 190-15, but only two unit blocks 190-0 and 190-15 are shown in this drawing because each block has the same structure. The first block 190-0 includes a source register 191-0 storing the LSB data of one word in the source area 202, a destination register 192-0 storing the LSB data of the corresponding word in the destination area 203, and a multiplexer 193-0. The last block 190-15 includes a source register 191-15 storing the MSB data of the word in the source area 202, a destination register 192-15 storing the MSB data of the word in the destination area 203, and a multiplexer 193-15. Each multiplexer 193 selects the source register 191 when the output of the associated AND gate is logic "1" and the destination register 192 when the output thereof is logic "0". The circuit 190 is interconnected via a data bus 195 to the display memory 3.

When the sequencer 10 receives the bit-block transfer instruction from the host processor 2, it reads the sixteen bits data of the word positioning the left end and bottom end of the source area 202 from the display memory 3 and then writes them into the source registers 191-0 to 191-15 via the bus 195. The sequencer 10 further reads the sixteen bits data of the associated word of the destination area 203 designated by the Y-coordinate data Ys and the X-coordinate data X's and then writes them into the destination registers 192-0 to 192-15. Moreover, the sequencer 10 writes the above-mentioned initial coordinate data, the number of words and the first to fourth offset data into the predetermined registers, respectively. As a result, the coordinate comparing operation is performed and the clipping mask information and the drawing mask information are then generated. In the illustrated embodiment shown in FIG. 2, the word of the destination area 203 designated by the Y-coordinate data Ys and the X-coordinate data X's is present outside the drawing-enable area 201, and therefore all the bits of the output of the AND gate circuit 180 take "0". As a result, the multiplexers 193-0 to 193-15 (see FIG. 6) select the destination registers 192-0 to 192-15 and then output the contents thereof to the bus 195 which are in turn supplied to the word of the destination area 203 in the display memory 3. That is, the data of this word is not rewritten with the figure data of the associated word of the source area 202. When the word of the destination area 203 designated by the Y-coordinate Ye and the X-coordinate X's is processed, this word is completely contained in the drawing-enable area 201, but includes the left side of the destination area 203. Therefore, the data from the starting bit (LSB) to the bit designated by the offset data "DS" of the output of the AND gate circuit 180 are "0" and the remaining bits take the data of "1". As a result, the data from the starting bit to the bit designated by the offset data "DS" of that word in the destination area 203 are maintained as they are and the data of the remaining bits are rewritten with the figure data of the associated bits of the word of the source area 202. Thus, only the portion 203-1 of the destination area 203 is rewritten with the figure data of the associated portion of the source area 202. The clipping function of the bit-block transfer instruction is thereby executed.

Figure 7:
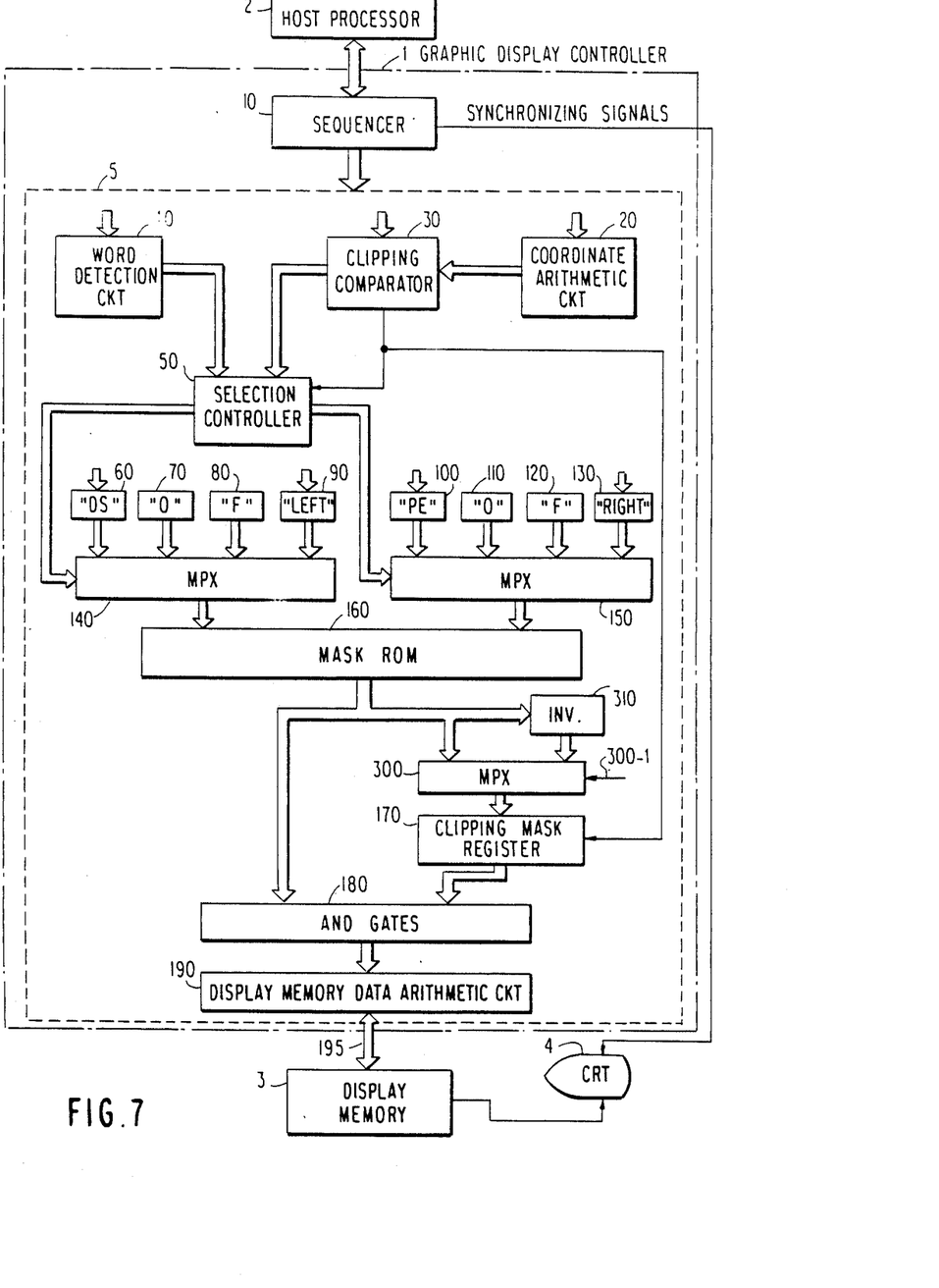
FIG. 7 is a block diagram representative of another embodiment of the present invention.

Another embodiment of the present invention is shown in FIG. 7, in which the same constituents as those shown in FIG. 1 are denoted by the same reference numerals to omit the further description thereof. In this embodiment, a multiplexer 300 and an inversion circuit 310 are provided. The multiplexer 300 receives the clipping mask information from the mask ROM 160 and the inverted information thereof via the inversion circuit 310. When the multiplexer 300 selects the output of the inversion circuit 310 in response to logic "1" of a selection control signal 300-1 supplied from the sequencer 10, the clipping mask register 170 latches the inverted clipping mask information. Therefore, the outside area of the clipping rectangle 200 is employed as a drawing-enable region and the data of a portion of the destination area 203 contained in the outside area of the clipping rectangle 200 are rewritten with the figure data of the associated portion of the source area 202. When the selection control signal 300-1 takes logic "0", the clipping mask information generated from the ROM 160 is stored in the clipping mask register 170 as it is. Therefore, the same operation as the circuit shown in FIG. 1 is derived.

The present invention is not limited to the above embodiments, but may be modified and changed without departing from the scope and spirit of the present invention. For example, the first and second clipping X-coordinate data $X_{min}$ and $X_{max}$ can be employed as reference X-coordinate data in the clipping comparator 30. In this case, the clipping function for drawing a straight line or a circle in dot units can be performed. The clipping mask information and the drawing mask information can be generated by an individual ROM simultaneously with each other.

What is claimed is:

1. A graphics display controller having a function of transferring figure data to a destination area including a portion contained in a drawing-enable area defined by a clipping rectangle having a diagonal line defined by first and second coordinate data, said controller comprising means for storing third coordinate data relative to said first coordinate data and fourth coordinate data relative to said second coordinate data, means for comparing coordinate data designating respective ones of words constituting said destination area with said third and fourth coordinate data to produce a comparison result which takes first data representing a first state in which the designated word is inside said drawing-enable area, or a second data representing a second state in which the designated word is outside said drawing-enable area, or third data representing a third state in which the designated word contains a boundary of said drawing-enable area, means responsive to said comparison result from said comparing means and to information representative of said boundary of said drawing-enable area for generating first information which designates all the bits of said designated word when said comparison result takes said first data, no bit of said designated word when said comparison result takes said second data and bits or bits of said designated word contained in said drawing-enable area when said comparison result takes said third data, means responsive to a position of said designated word and to information representative of a boundary of said destination area for generating second information which designates all the bits of said designated word when said designated word does not contain said boundary of said destination area and bit or bits of said designated word contained in said destination area when said designated word contains said boundary of said destination area, and means coupled to said first information generating means and said second information generating means for writing the figure data simultaneously into the bit or bits designated by both of said first and second information in each word of said destination area.

2. The controller as claimed in claim 1, wherein said third coordinate data designates a starting bit of a word having a bit designated by said first coordinate data and said fourth data designates a starting bit of a word having a bit designated by said second coordinate data.

3. The controller as claimed in claim 1, said first and second information are generated by a mask ROM.

4. A processor comprising a display memory including a plurality of words each consisting of a plurality of bits, each of said bits corresponding to individual coordinate data on a display screen, means for producing the coordinate data of a predetermined bit of a word to be controlled, means for storing first and second coordinate data which define a diagonal line on said display screen, said diagonal line defining a rectangular area on said display screen, means for comparing said coordinate data of said predetermined bit of said word to be controlled with said first and second coordinate data to produce a comparison result representing that said word to be controlled is inside or outside of said rectangular area or contains a boundary of said rectangular area, means responsive to said comparison result from said comparing means and to information representative of a boundary of said rectangular area for generating first mask information designating bits or bits contained in said rectangular area in said word to be controlled, means responsive to a bit length of figure data to be written into said word to be controlled for generating second mask information designating bit or bits to be changed in said word to be controlled, and means responsive to said first and second mask information for writing said figure data into the bit or bits of said word to be controlled designated by both of said first and second mask information.

5. A graphic controller for transferring drawing data to an overlapping portion of a destination area and a drawing-enable area, said destination area being defined by first and second X-coordinate data and first and second Y-coordinate data, said drawing-enable area being defined by a clipping rectangle defined by third and fourth X-coordinate data and third and fourth Y-coordinate data, said controller comprising first storage means for storing first offset data representative of a number of bits by which a first bit designated by said first X-coordinate and Y-coordinate data is apart from an end bit of a word containing said first bit, second storage means for storing second offset data representative of a number of bits by which a second bit designated by said second X-coordinate and Y-coordinate data is apart from an end bit of a word containing said second bit, third storage means for storing third offset data representative of a number of bits by which a third bit designated by said third X-coordinate and Y-coordinate data is apart from an end bit of a word containing said third bit, fourth storage means for storing fourth offset data representative of a number of bits by which a fourth bit designated by said fourth X-coordinate and Y-coordinate data is apart from an end bit of a word containing said fourth bit, fifth storage means for storing fifth X-coordinate data relative to said third X-coordinate data, sixth storage means for storing sixth X-coordinate data relative to said fourth X-coordinate data, seventh storage means for storing said third Y-coordinate data, eighth storage means for storing said fourth Y-coordinate data, means responsive to said first X-coordinate and Y-coordinate data for calculating X-coordinate and Y-coordinate data designating each of words constituting said destination area, means coupled to said fifth, sixth, seventh and eighth storage means and said calculating means for comparing the calculated X-coordinate and Y-coordinate data with said fifth and sixth X-coordinate data and said third and fourth Y-coordinate data to produce comparison resultant data representing that the word designated by said calculated X-coordinate and Y-coordinate data exists inside or outside said drawing-enable area or contains a boundary of said drawing-enable area, means coupled to said third and fourth storage means and said comparing means and responsive to said third and fourth offset data and said comparison resultant data for generating first information designating bit or bits contained in said drawing-enable area in said designated word, said first information designating all the bits of said designated word when said comparison resultant data represents that said designated word is inside said drawing-enable area, no bit of said designated word when said comparison resultant data represents that said designated word is outside said drawing-enable area and bit or bits of said designated word determined by at least one of said third and fourth offset data when said comparison resultant data represents that said designated word overlaps said boundary of said drawing-enable area, means coupled to said first and second storage means and responsive to said first and second offset data and a position of said designated word for generating second information designating bit or bits containing said destination area in said designated word, and means coupled to said first information generated means and said second information generating means for writing the drawing data into the bit or bits designated by both of said first and second information in said designated word, whereby said drawing data is transferred only to said overlapping portion of designation area and said drawing-enable area.

6. The controller as claimed in claim 5, wherein said writing means includes a first register temporarily storing each bit data of said designated word, a second register temporarily storing each bit data of said drawing data, means responsive to said first and second information for selecting reading data from said first and second registers, and means for transferring the read-out data from said reading means to said designated word.

7. A graphics display controller for transferring drawing data to an overlapping portion of a destination area and a drawing-enable area, said drawing-enable area being defined by a clipping rectangle having a diagonal line defined by first and second coordinate data, said destination area being defined by third and fourth coordinate data, said controller comprising first and storage means for storing fifth coordinate data representative of a first word having a first bit designated by said first coordinate data, second storage means for storing sixth coordinate data representative of a second word having a second bit designated by said second coordinate data, means responsive to said third and fourth coordinate data for calculating coordinate data designating each of words constituting said destination area, means for comparing the calculated coordinate data with said fifth and sixth coordinate data to produce first mask control data representing that the word designated by said calculated coordinate data exists inside or outside said drawing-enable area or lies on a boundary of said drawing-enable area, means responsive to said first mask control data, first offset data between said first bit and an end bit of said first word and second offset data between said second bit and an end bit of said second word for generating first mask information designating bit or bits of the designated word contained in said drawing-enable area, means responsive to a position of said designated word in said destination area for producing second mask control data representing that the position of said designated word is inside said destination area or contains a boundary of said destination area, means responsive to said second mask control data and information relative to said boundary of said destination area for generating second mask information designating bit or bits of said designated word contained in said destination area, and means for transferring the drawing data to the bit or bits designated by both of said first and second mask information in said designated word.

* * * * *

UNITED STATES PATENT AND TRADEMARK OFFICE
CERTIFICATE OF CORRECTION

PATENT NO. : 4,984,183
DATED : January 8, 1991
INVENTOR(S) : Mitsurou OHUCHI

It is certified that error appears in the above-identified patent and that said Letters Patent is hereby corrected as shown below:

Col. 5, line 57, delete "requires" and insert --required--.

Col. 7, line 20, after "data)" insert --"RIGHT" are "1", and the remaining bits take "0"--.

Col. 8, line 3, delete "delects", insert --detects--;

line 52, delete "regiters" and insert --registers--.

Signed and Sealed this

Seventh Day of July, 1992

Attest:

DOUGLAS B. COMER

Attesting Officer

Acting Commissioner of Patents and Trademarks